(12) United States Patent
Koslow

(10) Patent No.: US 7,296,691 B2
(45) Date of Patent: *Nov. 20, 2007

(54) CARBON OR ACTIVATED CARBON NANOFIBERS

(75) Inventor: Evan E. Koslow, Weston, CT (US)

(73) Assignee: KX Technologies LLC, Orange, CT (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/622,882

(22) Filed: Jul. 18, 2003

(65) Prior Publication Data

US 2005/0011827 A1  Jan. 20, 2005

(51) Int. Cl.
*B01D 39/04* (2006.01)
*B01D 39/02* (2006.01)
*B01D 39/18* (2006.01)
*B01D 39/00* (2006.01)

(52) U.S. Cl. .................. 210/501; 210/503; 210/505; 210/507; 210/508; 210/502.1; 210/500.29

(58) Field of Classification Search .............. None
See application file for complete search history.

(56) References Cited

U.S. PATENT DOCUMENTS

| | | | |
|---|---|---|---|
| 4,217,386 A * | 8/1980 | Arons et al. | 428/198 |
| 4,929,502 A * | 5/1990 | Giglia | 428/357 |
| 5,246,794 A * | 9/1993 | Blomgren et al. | 429/101 |
| 5,424,054 A | 6/1995 | Bethune et al. | |
| 5,681,468 A * | 10/1997 | Sawan et al. | 210/500.25 |
| 5,762,797 A * | 6/1998 | Patrick et al. | 210/497.1 |
| 6,183,854 B1 | 2/2001 | Stiller et al. | |
| 6,194,099 B1 | 2/2001 | Gernov et al. | |
| 6,321,915 B1 * | 11/2001 | Wilson et al. | 210/505 |
| 6,346,136 B1 | 2/2002 | Chen et al. | |
| 6,382,526 B1 | 5/2002 | Reneker et al. | |
| 6,419,839 B1 | 7/2002 | Cox et al. | |

* cited by examiner

*Primary Examiner*—Krishnan S. Menon
(74) *Attorney, Agent, or Firm*—DeLio & Peterson, LLC

(57) ABSTRACT

Carbon or activated carbon nanofibers are made from fibrillated nanofibers having a Canadian Standard Freeness of less than about 100, and/or a fiber diameter of less than or equal to about 400 nm. BET surface areas are greater than about 800 m²/g The fibrillated nanofibers can be made into a precursor paper and subjected to heat treatment to form carbon or activated carbon nanofiber sheets. A method of making is disclosed wherein carbonization occurs at a temperature of less than about 600° C. Activation occurs at temperatures greater than about 875° C. in less than or equal to about 30 minutes in an oxidizing atmosphere. Single step carbonization and activation in an oxidizing atmosphere is also disclosed. The carbon nanofibers or structures made therefrom are useful as filter media providing efficient adsorption and interception of microbiological contaminants due to the microporous carbon nanofiber structure.

30 Claims, 1 Drawing Sheet

CARBON OR ACTIVATED CARBON NANOFIBERS

This invention is directed to carbon or activated carbon nanofibers, carbon or activated carbon nanofiber sheets, and the manufacture of carbon or activated carbon nanofiber sheets.

SUMMARY OF THE INVENTION

The present invention is directed to, in a first aspect, Carbon nanofibers comprising fibrillated fibers having a Canadian Standard Freeness of less than about 100 or a fiber diameter of less than or equal to about 400 nm carbonized at a temperature of less than about 600° C.

In yet another aspect, the present invention is directed to a sheet comprising fibrillated fibers having a Canadian Standard Freeness of less than about 100 or a fiber diameter of less than or equal to about 400 nm carbonized at a temperature of less than about 600° C.

In still yet another aspect, the present invention is directed to a sheet comprising activated, carbonized fibrillated fibers having a BET surface area of greater than about 800 $m^2/g$, wherein, prior to carbonization and activation, the fibrillated fibers have a Canadian Standard Freeness of less than about 100 or a fiber diameter of less than or equal to about 400 nm and wherein activation occurs in less than or equal to about 30 minutes at a temperature greater than about 875° C. in an oxidizing atmosphere.

In still yet another aspect, the present invention is directed to a sheet comprising carbonized fibrillated fibers having a Canadian Standard Freeness of less than about 45 or a diameter of less than or equal to about 250 nm, and active agents captured within the carbon sheet, the active agents present in an amount greater than about 10 weight percent of a total weight of the sheet.

In yet a further aspect, the present invention is directed to a sheet comprising activated, carbonized fibrillated fibers wherein the fibrillated fibers have a Canadian Standard Freeness of less than about 45, a diameter of less than or equal to about 250 nm, and active agents captured therein, wherein the active agents are present in an amount greater than about 10 weight percent of a total weight of the sheet.

In yet a further aspect, the present invention is directed to a process of continuously making carbon nanofibers comprising the steps of: providing fibrillatable fibers; fibrillating the fibers to a Canadian Standard Freeness of less than about 100 or to a fiber diameter of less than or equal to about 400 nm, or both; and carbonizing the fibrillated fibers at a temperature of less than about 600° C.

In still yet a further aspect, the present invention is directed to a process of continuously making a carbon sheet comprising the steps of: forming a precursor paper from fibrillated fibers on a paper making machine wherein the fibrillated fibers have a Canadian Standard Freeness of less than about 100 or a diameter of less than or equal to about 400 nm; and carbonizing the precursor paper to form a carbon nanofiber sheet, wherein the carbonization occurs at a temperature of less than about 600° C.

In still yet a further aspect, the present invention is directed to a process of making an activated carbon nanofiber sheet comprising the steps of: forming a precursor paper of fibrillated nanofibers on a paper making machine wherein the fibrillated nanofibers have a Canadian Standard Freeness of less than about 100, a diameter of less than or equal to about 400 nm, or a combination thereof; carbonizing the precursor paper; and activating the carbonized precursor paper in an oxidizing atmosphere at elevated temperatures to form an activated carbon nanofiber sheet.

In still yet a further aspect, the present invention is directed to a method of removing microbiological contaminants from a fluid comprising the steps of: providing a filter medium having a microporous structure comprising carbonized nanofibers having a Canadian Standard Freeness of less than about 100 or a fiber diameter of less than or equal to about 400 nm, wherein the nanofibers are carbonized at a temperature of less than about 600° C.; contacting a microbiologically contaminated fluid with the filter medium; removing the microbiological contaminants in the fluid by adsorption and interception within the medium.

BRIEF DESCRIPTION OF THE DRAWINGS

The features of the invention believed to be novel and the elements characteristic of the invention are set forth with particularity in the appended claims. The figures are for illustration purposes only. The invention itself, however, both as to organization and method of operation, may best be understood by reference to the description of the preferred embodiment(s) that follow taken in conjunction with the accompanying drawing in that:

DETAILED DESCRIPTION OF THE INVENTION

Figure 1:
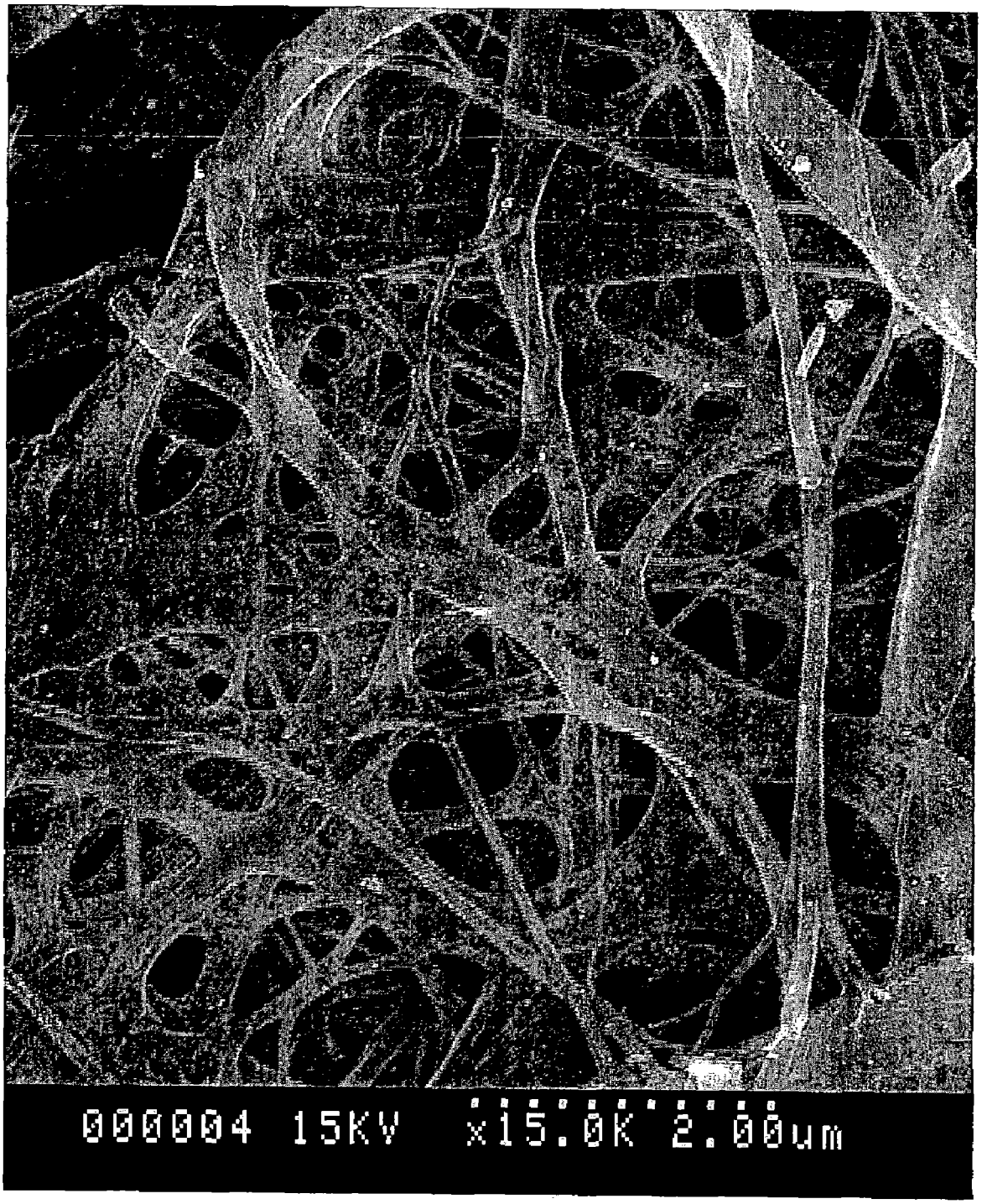
FIG. 1 is a scanning electron micrograph of a carbon nanofiber sheet of the present invention magnified 15,000×.

In describing the preferred embodiment of the present invention, reference will be made herein to FIG. 1.

The present invention provides carbon or activated carbon nanofibers, carbon or activated carbon nanofiber sheets, and an economical process of making same, preferably in a continuous fashion. The carbon nanofibers are derived from fibrillated nanofibers having a Canadian Standard Freeness of less than about 100, and/or fiber diameters of less than about 400 nanometers and subjected to heat treatment thereby carbonizing the fibrillated nanofibers. The resultant carbon nanofibers may be further activated in an oxidizing atmosphere at high temperature to form activated carbon nanofibers.

The fibrillated nanofibers can be continuously formed into a precursor paper using traditional paper making equipment, sent directly or indirectly into a furnace for heat treatment to carbonize the paper, and further activated to form the activated carbon nanofiber sheets. Functional active agents may be added to the precursor paper such that the active agents are captured within the carbon nanofiber sheet and can still retain their functionality. The sheet can also be impregnated. The present invention provides an economical process of making carbon or activated carbon nanofiber sheets with a minimum of steps not found in the prior art, and in a potentially continuous fashion. The need for pre- and post-treatments of the carbon nanofiber sheet prior to its use can be eliminated. The carbon and activated carbon nanofiber sheets of the present invention show excellent surface area for use as, for example, electrodes, catalyst supports, and filtration media.

The Precursor Paper

Fibers useful in making the precursor paper prior to carbonization and/or activation are any fibers that can be fibrillated. The nanofibers preferably comprise organic polymeric fibers that are capable of being fibrillated. Fibrillated fibers are most preferred due to their exceptionally fine dimensions and potentially low cost. Such fibrillated fibers include, but are not limited to, polymers such as polyamide, acrylic, acrylonitrile, liquid crystal polymers such as VECTRAN®, and the like, engineered resins, cellulose, rayon, ramie, wool, silk, or combinations thereof. A preferred fibrillated fiber is cellulose, namely lyocell.

Fibrillated cellulose fibers can be made by direct dissolution and spinning of wood pulp in an organic solvent, such as an amine oxide, and are known as lyocell fibers. Lyocell fibers have the advantage of being produced in a consistent, uniform manner, thus yielding reproducible results, which may not be the case for, for example, natural cellulose fibers. Further, the fibrils of lyocell are often curled. The curls provide a significant amount of fiber entanglement. As an added advantage, the fibrillated lyocell fibers may be produced in large quantities using equipment of modest capital cost. It will be understood that fibers other than cellulose may be fibrillated to produce extremely fine fibrils, such as for example, synthetic fibers, in particular, acrylic or polyacrylonitrile (PAN) fibers, or other cellulosic materials. Upon carbonization, the fibers can be bonded together using heat and/or pressure, and/or caused to entangle so as to capture functional active agents in the form of other particles or fibers to result in these materials being retained within a carbon nanofiber sheet.

When produced by a wet laid process from nanofibers such as cellulose or polymer fibers, such fibers should have a Canadian Standard Freeness of less than or equal to about 100, preferably less than or equal to about 45, and most preferably less than or equal to about 0. However, it should be recognized that in some cases, Canadian Standard Freeness is not an ideal measure of fiber size, as in the case of extremely stiff fibers such as those produced from liquid crystal polymers such as VECTRAN®. In these cases, the fiber size should be directly assayed using microscopy. Preferably, a significant portion of the fibers should have a diameter less than or equal to about 1000 nanometers, more preferably less than or equal to about 400 nanometers, and fibers less than or equal to about 250 nanometers in diameter are most preferred. It is preferable to chop the original fibers prior to fibrillation to a length of about 1 millimeter to about 8 millimeters, preferably about 2 millimeters to about 6 millimeters, and more preferably about 3 millimeters to about 4 millimeters, and to sustain this fiber length during the fibrillation process by avoiding excessive fiber cutting.

Other ingredients may also be incorporated into the precursor paper, such as, for example, small particles or other fibers of active agents. After carbonization, these ingredients can retain their original form and provide strength to the resultant carbon nanofiber sheet or also undergo chemical reaction or activation during the production of the carbon nanofibers.

Active Agents for Increased Functionality/Reinforcement

One or more active agents either in particulate, fiber, whisker, or powder form may be admixed with the nanofibers prior to carbonization to provide added functionality and/or reinforcement of the resultant carbon nanofiber sheet. Useful additives may include, but are not limited to, metals, metal salts, metal oxides, glass, alumina, carbon, activated carbon, silicates, ceramics, zeolites, diatomaceous earth, activated bauxite, fuller's earth, calcium sulfate, titanium dioxide, magnesium hydroxide, manganese oxides, magnesia, perlite, talc, clay, bone char, pitch, calcium hydroxide, calcium salts, or combinations thereof. Such active agents can aid in the adsorption of contaminants or as a catalyst resident on the carbon nanofiber sheet.

The amount of active agents in the carbon nanofiber sheet is dependent upon the particular use of the carbonized or activated nanofiber sheet. It is contemplated that the active agents can be present in an amount of greater than about 10 weight percent, preferably greater than about 50 weight percent, and can be up to about 97 weight percent of a total weight of the carbon nanofiber sheet. Preferably, the average particle size of the active agents is less than or equal to about 100 µm, more preferably less than or equal to about 50 µm, most preferably less than or equal to about 10 µm, and can be about 1 µm. As the particle or fiber size of the active agents decrease, it is possible to incorporate more of the active agents into the carbon nanofiber sheet.

Functionality of the carbon or activated carbon nanofibers can be enhanced by adding other gases to the atmosphere during carbonization and/or activation. For example, the addition of ammonia, an amine or other chemicals into the furnace atmosphere can form functional groups on at least a portion of a surface of the nanofibers. Oxides, carbonyls, carboxyls, hydroxyls, carbonates, amino, and other functional groups are easily incorporated in the carbon or activated carbon nanofibers. Catalysts can also be directly incorporated onto the carbon or activated carbon nanofibers during carbonization and/or activation.

The fibrillated nanofibers or the precursor paper can be impregnated with agents to control the pore structure within the resultant carbon or activated carbon nanofibers. Such agents include, but are not limited to, caustics, phosphoric acid, zinc chloride, and other similar materials. Also the fibrillated nanofibers or precursor paper can be impregnated with catalysts that are incorporated into the final carbon nanofibers. The carbon nanofibers or structures comprising the carbon nanofibers can be impregnated with chemical agents and/or catalyst using methods well known in the art.

Carbon nanofibers are by themselves extremely effective in the direct adsorption of microbiological contaminants. The present invention allows efficient interception and adsorption in a microporous nanofiber carbon structure without undue compression of the structure or packing fibers. Should the carbon or activated carbon fibers, or structures made therefrom, be used as filtration media, the application of a microbiological interception enhancing agent is advantageous. The carbon or activated carbon nanofibers or structures can be chemically treated with any compatible microbiological interception enhancing agent known in the art, with or without a biologically active metal. Examples of suitable anti-microbial agents include, without limitation, any bactericidal agent, bacteriostatic agent, fungicidal agent, fungistatic agent, or the like, that are preferably efficacious against a broad spectrum of microbes. Specific examples of suitable bactericidal/bacteriostatic agents include, without limitation, POLYMYCIN™, BACITRACIN™, lysozyme, TRICLOSAN™., DOWCIDE™, quaternary amine salts, polyphenols, acid-anionic surfactants, amphoteric surfactant disinfectants, biguanidines, and the like. Specific examples of suitable fungicidal/fungistatic agents include, without limitation, dithiocarbamates, phthalimides, dicarboximides, organophosphates, benzimidazoles, carboxanilides, phenylamides, phosphites, and the like.

Preferably, the microbiological interception enhancing agent is capable of creating a positive charge on the surface of the nanofibers to aid in the electro-kinetic interception of microbiological contaminants. The chemical treatment produces a strong positive charge upon the treated surfaces as measured using streaming or zeta potential analysis and this positive charge is retained at pH values below 10. The cationic material may be a colloid, a small charged molecule or a linear or branched polymer having positively charged atoms along the length of the polymer chain having a counter ion associated therewith. The cationic material is adsorbed on at least a portion of the nanofibers and a biologically active metal can be precipitated with the counter ion in direct proximity to the cationic material and also on at least a portion of the nanofibers.

If the cationic material is a polymer, the charge density is preferably greater than about 1 charged atom per about every 30 Angstroms, preferably greater than about 1 charged atom per about every 20 Angstroms, and more preferably greater than about 1 charged atom per about every 10 Angstroms of molecular length. The higher the charge density on the cationic material, the higher the concentration of the counter ion associated therewith. A high concentration of an appropriate counter ion can be used to drive the precipitation of the biologically active metal. The high charge density of the cationic material provides the ability to adsorb and significantly reverse the normal negative charge of the nanofibers making it more useful as a microbiological interception enhanced filter medium. The cationic material should consistently provide a highly positively charged surface to the nanofibers as determined by a streaming or zeta potential analyzer, whether in a high or low pH environment.

The use of a cationic polymer of sufficiently high molecular weight allows treatment of the surfaces of the nanofibers without serious attendant impact upon any adsorptive capabilities of the mezo-pores and micro-pores of the carbon or activated carbon nanofibers. The cationic material can have a molecular weight greater than or equal to about 5000 Daltons, preferably greater than or equal to 100,000 Dalton, more preferably greater than or equal to about 400,000 Daltons, and can be greater than or equal to about 5,000,000 Daltons.

The cationic material includes, but is not limited to, quaternized amines, quaternized amides, quaternary ammonium salts, quaternized imides, benzalkonium compounds, biguanides, cationic aminosilicon compounds, cationic cellulose derivatives, cationic starches, quaternized polyglycol amine condensates, quaternized collagen polypeptides, cationic chitin derivatives, cationic guar gum, colloids such as cationic melamine-formaldehyde acid colloids, inorganic treated silica colloids, polyamide-epichlorohydrin resin, cationic acrylamides, polymers and copolymers thereof, combinations thereof, and the like. Charged molecules useful for this application can be small molecules with a single charged unit and capable of being attached to at least a portion of the nanofibers. The cationic material preferably has one or more counter ions associated therewith which, when exposed to a biologically active metal salt solution, cause preferential precipitation of the metal in proximity to the cationic surface to form a colloidal metal precipitate complex.

Exemplary of amines may be pyrroles, epichlorohydrin derived amines, polymers thereof, and the like. Exemplary of amides may be those polyamides disclosed in International Patent Application No. WO 01/07090, and the like. Exemplary of quaternary ammonium salts may be homopolymers of diallyl dimethyl ammonium halide, epichlorohydrin derived polyquaternary amine polymers, quaternary ammonium salts derived from diamines and dihalides such as those disclosed in U.S. Pat. Nos. 2,261,002, 2,271,378, 2,388,614, and 2,454,547, all of which are incorporated by reference, and in International Patent Application No. WO 97/23594, also incorporated by reference, polyhexamethylenedimethylammonium bromide, and the like. The cationic material may be chemically bonded, adsorbed, or crosslinked to the nanofiber and/or to an active particle or fiber captured within the nanofiber material.

Furthermore, other materials suitable for use as the cationic material include BIOSHIELD® available from Bio-Shield Technologies, Inc., Norcross, Ga. BIOSHIELD® is an organosilane product including approximately 5% by weight octadecylaminodimethyltrimethoxysilylpropyl ammonium chloride and less than 3% chloropropyltrimethoxysilane. Another material that may be used is SURFACINE®, available from Surfacine Development Company LLC, Tyngsboro, Mass. SURFACINE® comprises a three-dimensional polymeric network obtained by reacting poly(hexamethylenebiguanide) (PHMB) with 4,4'-methylene-bis-N,N-dilycidylaniline (MBGDA), a crosslinking agent, to covalently bond the PHMB to a polymeric surface. Silver, in the form of silver iodide, is introduced into the network, and is trapped as submicron-sized particles. The combination is an effective biocide, which may be used in the present invention.

The cationic material can be exposed to a biologically active metal salt solution such that a metal colloidal complex precipitates onto at least a portion of the surface of at least some of the nanofibers. For this purpose, the metals that are biologically active are preferred. Such biologically active metals include, but are not limited to, silver, copper, zinc, cadmium, mercury, antimony, gold, aluminum, platinum, palladium, and combinations thereof. The most preferred biologically active metals are silver and copper. The biologically active metal salt solution is preferably selected such that the metal and the counter ion of the cationic material are substantially insoluble in an aqueous environment to drive precipitation of the metal complex. Preferably, the metal is present in an amount of about 0.01% to about 2.0% by weight of the nanofibers.

A particularly useful microbiological interception enhancing agent is a silver-amine-halide complex. The cationic amine is preferably a homopolymer of diallyl dimethyl ammonium halide having a molecular weight of about 400,000 Daltons or other quaternary ammonium salts having a similar charge density and molecular weight. A homopolymer of diallyl dimethyl ammonium chloride useful in the present invention is commercially available from Nalco Chemical Company of Naperville, Ill., under the tradename MERQUAT® 100. The chloride counter ion may be replaced with a bromide or iodide counter ion. When contacted with a silver nitrate solution, the silver-amine-halide complex precipitates on at least a portion of the nanofibers.

Method of Making Carbon or Activated Carbon Nanofibers and Sheets Thereof

In a preferred wet laid process, a fiber tow is chopped to a specific length, usually in the range of about 1 millimeter to about 8 millimeters and in particular in the range of about 3 millimeters to about 4 millimeters. The chopped fibers are fibrillated in a device having characteristics similar to a blender, or on a large scale, in machines commonly referred to as a "hi-low", a "beater" or a "refiner". The fiber is subjected to repetitive stresses, while further chopping and the reduction of fiber length is minimized. As the fibers undergo these stresses, the fibers split as a result of weaknesses between amorphous and crystalline regions and the Canadian Standard Freeness (CSF), which is determined by a method well known in the art, begins to decline. Samples of the resulting pulp can be removed at intervals, and the CSF used as an indirect measure of the extent of fibrillation. While the CSF value is slightly responsive to fiber length, it is strongly responsive to the degree of fiber fibrillation.

Thus, the CSF, which is a measure of how easily water may be removed from the pulp, is a suitable means of monitoring the degree of fiber fibrillation whenever the fibers have a good tendency to form a wet-laid sheet. This is not necessarily the case when handling very stiff fibers such as those made from liquid crystal polymers such as VECTRAN®. If the surface area is very high, then very little water will be drained from the pulp in a given amount of time and the CSF value will become progressively lower as the fibers fibrillate more extensively. The fibrillated fiber of a given CSF value can be directly used for producing paper or dewatered on a variety of different devices, including a dewatering press or belt, to produce a dewatered pulp. The dewatered pulp can be subsequently used to make a wet-laid paper. Generally, for application in the present invention, a pulp with a CSF of below 100 is used, preferably, the CSF should be less than or equal to about 45, and more preferably less than or equal to about 0. A Canadian Standard Freeness below 0 is achieved when the fibers are fibrillated beyond the time needed to achieve a Canadian Standard Freeness of 0. The fibers can be directly sent to pulp preparation systems to create a furnish suitable for paper making, or dewatered and carbonized and/or activated. If functional active agents are needed, they are admixed with the fibrillated fibers, preferably in a slurry, prior to being sent to the furnace or a paper making machine.

The precursor paper can be made using dry or wet laid processes and subject to carbonization in an inert or reducing atmosphere, preferably a nitrogen atmosphere. Further heat treatment in an oxidizing atmosphere activates the carbonized nanofiber sheet.

An exemplary dry laid process starts with staple fibers, which can be separated by carding into individual fibers and are then laid together to a desired thickness by an aerodynamic process to form an unbonded fiber sheet. The unbonded fibers can then be subjected to hydraulic jets to both fibrillate and hydroentangle the fibers. A similar process can be performed on certain plastic films that when exposed to high pressure jets of water, are converted into webs of fibrillated fibers. Functional active agents can be incorporated into the precursor paper by dropping the active agents onto the fiber sheet as the nanofibers are laid.

Once the precursor paper is formed, it can go directly or indirectly from the paper making machine or dry laid machinery into a furnace for carbonization/activation. Although the precursor paper can be treated with a dehydration promoter, it is not necessary in practicing the present invention, and eliminates a process step further promoting efficiency and reduction of manufacturing costs. The sheet can also be densified during the paper-making process by passing the precursor paper through a wet press or through the use of a calendar to achieve maximum density in the final product. Heated calendaring of the sheet can produce fiber-fiber bonds resulting in a highly stabilized web with minimal tendency to shed fibers or particles.

Heretofore, the typical production rate of carbonized and activated fiber sheets in conventional tunnel furnaces has been 1 to 5 cm/min. The precursor paper of fibrillated fibers described herein can be laid, carbonized, and activated at rates of several feet per minute because the total time required to carbonize the sheet is often less than a few minutes and the time required to produce a highly activated carbon sheet is also about 5 minutes. This is nearly an order of magnitude faster and more efficient than what was previously known in the prior art. Activation at temperatures of about 875° C. requires less than or equal to about 30 minutes, preferably less than or equal to about 17 minutes, and can be less than or equal to about 11 minutes. Activation temperature up to about 1000° C. can occur in less time, about 5 to about 7 minutes. Carbonization and activation can be performed in a single heat treatment stage in a matter of minutes. To achieve high speed continuous carbonization and activation, the precursor paper can be fed into the furnace in a sinusoidal fashion as is known in the art. Oxidizing atmospheres suitable for activation can also include steam, small amounts of oxygen, or similar gases.

Carbonization was performed under an inert atmosphere, e.g. under nitrogen, at temperatures of less than about 600° C., preferably about 275° C. to about 400° C. Thereafter, the temperature was rapidly raised to an activation temperature of about 875° C. to about 1000° C. in a slightly oxidizing atmosphere, in the presence of carbon dioxide, with the temperature rising at a rate of about 10° C./min to about 30° C./min, although other oxidizing atmospheres can serve the same function. The activation temperature was held for about 3 to about 10 minutes, and preferably about 5 minutes, to activate the carbon nanofibers, with the activation occurring during the rapid temperature ramp-up from about 875° C. to the maximum temperature and during cooling to about 875° C. A single heat treatment to carbonize and activate the precursor paper can be performed by heating the precursor paper in a carbon dioxide atmosphere with a rapid temperature increase to the activation temperature, holding at the activation temperature for about 3 to about 10 minutes, preferably, about 5 minutes, and rapid cooling to room temperature. Cooling is accomplished in the carbon dioxide atmosphere in the single step carbonization/activation. FIG. 1 is a scanning electron micrograph of a carbon nanofiber sheet of the present invention at 15,000× magnification. The carbon nanofibers appear to be bonded at fiber intersections creating a carbon fiber web with membrane-like features.

Because it is not necessary to use chemical activation, such as the use of alkaline hydroxides, phosphoric acid, zinc, or other metal salts, the carbon and activated carbon nanofiber sheets of the present invention can be used directly as it is obtained from the furnace upon cooling. The activation and carbonization process used in the present invention does not require multiple passes through the furnace as is sometime required in the prior art.

The BET surface area of the carbonized sheet is usually about 50 $m^2/g$ and the surface area of the activated carbon nanofiber sheets are greater than about 800 $m^2/g$, and preferably greater than about 1000 $m^2/g$.

The precursor paper may be treated with chemicals prior to carbonization to either enhance the carbonization and activation processes, or to adjust the resulting pore size distribution, or to produce a sheet impregnated with catalysts, or serve as a catalyst support.

The carbon and activated carbon nanofiber sheets of the present invention are low cost and can serve as efficient electrodes; catalyst supports, particularly in fuel cells; and filtration media.

EXAMPLES

The following examples are provided to illustrate the present invention and should not be construed as limiting the scope of the invention.

Hand sheets of the precursor papers used in the following examples were made with fibrillated lyocell nanofibers having a Canadian Standard Freeness of 0, unless otherwise stated, using the following general method. Materials were weighed out and blended with 2.0 L deionized water for at least 5 minutes in a stainless steel Waring blender. When non-lyocell fibers were used, they were blended separately for about 3 minutes prior to mixing with the fibrillated lyocell nanofibers. The fiber mixture was poured into a 30.5×30.5 cm$^2$ stainless steel FORMAX™ paper making deckle with a sheet of REEMAY™ 2004 nonwoven laid over the 100 mesh base screen as a support layer. Functional active or reinforcing agents were periodically slurried and blended with the fiber mixture. The deckle was filled to a total of about 12 L of water containing the various fibers and functional active or reinforcing agents, if present. A 30.5× 30.5 cm$^2$ stainless steel agitator plate having 60 holes of 2 cm diameter was used to plunge the ingredients in the deckle up and down from top to bottom about 8 to 10 times. The water was removed from the fiber mixture by pulling a slight vacuum below the deckle to cause a sheet to form on the REEMAY™ nonwoven. Once the bulk of the water is removed, supplemental dewatering is accomplished with a vacuum pump to remove additional excess moisture and to create a relatively smooth, flat, fairly thin paper-like sheet. The resulting sheet is separated from the screen and combined with a blotter sheet on both top and bottom. The combination of sheets is gently rolled with a 2.27 kg marble rolling pin to remove excess water and smooth out the top surface of the sheet. The sheet is then placed between two fresh and dry blotter sheets and placed on a FORMAX® sheet dryer for about 10 to about 15 minutes at about 120° C. The REEMAY™ nonwoven sheet is separated and discarded at this point. Commercial manufacture of the precursor paper can be accomplished on a Fournier wire, rotoformer, or similar systems. All hand sheets had a dry weight of 24.0 g unless otherwise stated. The samples were carbonized/activated in a Cahn TG 2131 thermogravimetric analyzer (TGA) furnace available from Thermo Cahn, Madison, Wis.

Example 1

A sample of the precursor sheet was placed in the TGA furnace in an inert atmosphere with a nitrogen flow rate of 150 ml/min and subject to the following heat treatment with activation as noted.
1. Temperature at 30° C.; hold for 10 min
2. Temperature ramp-up 30-200° C.; rate 10° C./min
3. Temperature at 200° C.; hold for 10 min
4. Temperature ramp-up 200-400° C.; rate 10°/min
5. Temperature at 400° C.; hold for 5 min
6. Temperature at 400° C.; hold for 10 min in CO$_2$
7. Temperature ramp-up 400-900° C.; rate 10°/min in CO$_2$
8. Rapid cool down; rate=−30° C./min in N$_2$ Activation took place in a 100% carbon dioxide atmosphere at a flow rate of 150 ml/min. A rapid cool down from 900° C. to 30° C. at a rate of −30° C. ml/min occurred in a nitrogen atmosphere at a flow rate of 150 ml/min. BET surface area was 816 m$^2$/g.

Example 2

The sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-900° C.; rate 30° C./min
3. Temperature at 900° C.; hold for 10 min
4. Rapid cool down; rate=−30° C./min Activation took place in about 10 minutes when calculated from 900° C. BET surface area was 1039 m$^2$/g.

Example 3

The precursor sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-1000° C.; rate 30° C./min
3. Rapid cool down; rate=−30° C./min Activation took place in 7 minutes when calculated from 900° C. BET surface area was 1106 m$^2$/g.

Example 4

The precursor sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-1000° C.; rate 30° C./min
3. Temperature at 1000° C.; hold for 5 min
4. Rapid cool down; rate=−30° C./min Activation took place in 11 minutes when calculated from 900° C. BET surface area was 1369 m$^2$/g.

Example 5

The precursor sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-325° C.; rate 30° C./min
3. Temperature at 325° C.; hold for 20 min
4. Temperature ramp-up 325-1000° C.; rate 30° C./min
5. Rapid cool down; rate=−30° C./min Activation took place in 7 minutes when calculated from 900° C. BET surface area was 987 m$^2$/g.

Example 6

The precursor sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-1000° C.; rate 30° C./min
3. Rapid cool down; rate=−30° C./min Activation took place in 7 minutes when calculated from 900° C. BET surface area was 965 m$^2$/g.

Example 7

The precursor sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-275° C.; rate 30° C./min
3. Temperature ramp-up 275-425° C.; rate=5° C./min
4. Temperature ramp-up 425-1000° C.; rate=30° C./min
5. Rapid cool down; rate=−30° C./min Activation took place in 6 minutes when calculated from 900° C. BET surface area was 919 m$^2$/g.

Example 8

The precursor sheet was placed in the TGA furnace in a 100% carbon dioxide atmosphere at a flow rate of 300 ml/min and subject to the following heat treatment.
1. Temperature at 30° C.; hold for 10 min
2. Temperature ramp-up 30-275° C.; rate 30° C./min 3. Temperature ramp-up 275-425° C. rate 5° C./min
4. Temperature ramp-up 425-1000° C.; rate 30° C./min
5. Rapid cool down; rate=–30° C./min Activation took place in 7 minutes when calculated from 900° C. BET surface area was 1010 m²/g Example 9

The precursor sheet was made with fibrillated lyocell nanofibers having a Canadian Standard Freeness of 23. The sheet was placed in the TGA furnace in a 100% carbon dioxide atmosphere at a flow rate of 150 ml/min and subject to the following heat treatment.
1. Temperature at 30° C.; hold for 10 min
2. Temperature ramp-up 30-275° C.; rate=30° C./min
3. Temperature ramp-up 275-375° C.; rate 3° C./min
4. Temperature ramp-up 375-1000° C.; rate=30° C./min
5. Rapid cool down; rate=–30° C./min Activation took place in 8 minutes when calculated from 900° C. BET surface area was 1047 m²/g.

Example 10

A precursor sheet was made with 24.0 g (dry weight) fibrillated lyocell fibers having a Canadian Standard Freeness of less than or equal to about 0, and 2.4 g microglass fibers available from Johns Manville Company of Denver, Colo., under the trade designation FIBREGLASS™ #108. The sheet was placed in the TGA furnace in a 100% carbon dioxide atmosphere at a flow rate of 150 ml/min and subject to the following heat treatment.
1. Temperature at 30° C.; hold for 10 min
2. Temperature ramp up 30-275° C.; rate=30° C./min
3. Temperature ramp-up 275-375° C.; rate 3° C./min
4. Temperature ramp-up 375-1000° C.; rate=30° C./min
5. Rapid cool down; rate=–30° C./min Activation took place in about 17 minutes as the temperature reached 1000° C. After activation, the activated carbon nanofiber sheet contained about 46.8 weight percent of glass microfibers. The BET surface area of the activated carbon, adjusted to account for the glass microfibers, was 1018 m²/g.

Table I compares the results of Examples 1 to 10 after activation.

TABLE I

| Ex. | CSF | Activation Time (min) @ ≧ 900° C. | BET (m²/g) | Mass Lost (%) |
| --- | --- | --- | --- | --- |
| 1 | 0 | 5 | 816 | 72.2 |
| 2 | 0 | 9-10 | 1039 | 79.1 |
| 3 | 0 | 7 | 1106 | 79.4 |
| 4 | 0 | 11 | 1369 | 78.9 |
| 5 | 0 | 7 | 987 | 68.6 |
| 6 | 0 | 7 | 965 | 60.9 |
| 7 | 0 | 6 | 919 | 64.1 |
| 8 | 0 | 7 | 1010 | 65.0 |
| 9 | 23 | 8 | 1047 | 62.6 |
| 10* | 0 | 17 | 1018 | 78.7 |

*Contains microglass fibers; mass loss takes into account only the carbonized/activated fibers.

Example 11

A precursor sheet, having a basis weight of 12.0 g, was made with 30% by weight of fibrillated lyocell nanofibers having a Canadian Standard Freeness of less than about 0, 60% by weight of $TiO_2$ having an average particle size of about 1.6 µm, and 10% by weight of FIBREGLASS™ #108 microglass fibers. The sheet was placed in the TGA furnace in a nitrogen atmosphere at a flow rate of 150 ml/min and subject to the following heat treatment.
1. Temperature at 30° C.; hold for 5 min
2. Temperature ramp-up 30-500° C.; rate=20° C./min
3. Temperature at 500° C.; hold for 30 min
4. Rapid cool down; rate=–30° C./min The $TiO_2$ sheet was carbonized in about 1 to about 2 minutes.

The process of the present invention provides activated carbon nanofibers with BET surface areas greater than 800 m²/g, and preferably greater than about 1000 m²/g.

The present invention provides exceptional carbon and activated carbon nanofibers and sheets thereof with a high yield that can be produced continuously. The exceedingly high surface area of the carbon or activated carbon sheets provides efficient interception of microbiological contaminants including viral interception. Such microbiological interception can be further enhanced using a microbiological interception enhancing agent with or without a biologically active agent to suppress bacterial and viral activity. Adding other gases during heat treatment provides useful surface chemistry to the carbon or activated carbon nanofibers.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A sheet comprising activated, carbonized fibrillated lyocell fibers and a microbiological interception enhancing agent, wherein prior to carbonization said fibrillated lyocell fibers have a Canadian Standard Freeness of less than about 100 and a fiber diameter of less than or equal to about 400 nm, said sheet carbonized at a temperature of less than about 600° C., said microbiological interception enhancing agent comprising a biologically active metal precipitated with a counter ion of a cationic material that is adsorbed on at least a portion of said fibers to form a metal colloidal precipitate complex on a portion of a surface of at least some of said activated, carbonized fibers.

2. A sheet of claim 1 wherein said sheet is further heated to form an activated carbon sheet having a BET surface area of greater than about 800 m2/g.

3. A sheet of claim 1 wherein the fibrillated fibers have a Canadian Standard Freeness of less than about 45 or a fiber diameter of less than about 250 nm.

4. A sheet of claim 1 further including active agents captured therein.

5. A sheet of claim 4 wherein the active agents comprise metals, metal salts, metal oxides, glass, alumina, carbon, activated carbon, silicates, ceramics, zeolites, diatomaceous earth, activated bauxite, fuller's earth, calcium sulfate, titanium dioxide, magnesium hydroxide, manganese oxides, magnesia, perlite, talc, clay, bone char, pitch, calcium hydroxide, calcium salts, or combinations thereof.

6. A sheet of claim 1 wherein the fibrillated fibers are admixed with active agents, and made into a paper prior to carbonization.

7. A sheet of claim 1 wherein said sheet is used as an electrode.

8. A sheet of claim 1 further including a catalyst or a catalyst support.

9. A filter medium comprising the sheet of claim 1.

10. A sheet comprising activated, carbonized fibrillated lyocell fibers and a microbiological interception enhancing agent comprising a biologically active metal precipitated with a counter ion of a cationic material on at least a portion of said fibers to form a metal colloidal complex on a portion of a surface of at least some of said activated, carbonized fibrillated lyocell fibers, said fibrillated lyocell fibers having a BET surface area of greater than about 800 m2/g, wherein prior to carbonization and activation, the fibrillated fibers have a Canadian Standard Freeness of less than about 100 or a fiber diameter of less than or equal to about 400 nm and wherein activation occurs in less than or equal to about 30 minutes at a temperature greater than about 875° C. in an oxidizing atmosphere.

11. A sheet of claim 10 wherein the fibrillated fibers have a Canadian Standard Freeness of less than about 45 or a fiber diameter of less than about 250 nm.

12. A sheet of claim 10 wherein the fibrillated fibers comprise polymers, liquid crystal polymers, engineered resins, cellulose, rayon, ramie, wool, silk, or combinations thereof.

13. A sheet of claim 10 further including active agents captured therein.

14. A sheet of claim 13 wherein the active agents comprise metals, metal salts, metal oxides, glass, alumina, carbon, activated carbon, silicates, ceramics, zeolites, diatomaceous earth, activated bauxite, fuller's earth, calcium sulfate, titanium dioxide, magnesium hydroxide, manganese oxides, magnesia, perlite, talc, clay, bone char, pitch, calcium hydroxide, calcium salts, or combinations thereof.

15. A sheet of claim 10 wherein the fibrillated fibers are admixed with active agents, and made into a paper prior to carbonization and activation.

16. A sheet of claim 10 further including a catalyst or a catalyst support.

17. A sheet comprising activated, carbonized fibrillated fibers having a microbiological interception enhancing agent on at least a portion of at least some of said fibrillated fibers, said microbiological interception enhancing agent comprising a biologically active metal precipitated with a counter ion of a cationic material that is adsorbed on said at least portion of said fibrillated fibers to form a metal colloidal complex on a portion of a surface of at least some of said activated, carbonized fibrillated fibers.

18. The sheet of claim 17 wherein prior to carbonization said fibrillated fibers have a Canadian Standard Freeness of less than about 100.

19. The sheet of claim 17 wherein prior to carbonization said fibrillated fibers have a Canadian Standard Freeness of less than about 45.

20. The sheet of claim 17 wherein prior to carbonization said fibrillated fibers have a fiber diameter of less than about 250 nm.

21. The sheet of claim 17 further including active agents captured therein.

22. The sheet of claim 17 further including a catalyst or a catalyst support.

23. The sheet of claim 17 wherein said cationic material is selected from the group consisting of a colloid, a charged molecule, and a linear or branched polymer having positively charged atoms along a length of said polymer chain having said counter ion associated therewith.

24. A sheet comprising activated, carbonized fibrillated lyocell fibers having a microbiological interception enhancing agent on at least a portion of at least some of said fibrillated fibers, said microbiological interception enhancing agent comprising a biologically active metal precipitated with a counter ion of a cationic material that is adsorbed on said at least portion of said fibrillated fibers to form a metal colloidal complex on a portion of a surface of at least some of said activated, carbonized fibrillated fibers.

25. The sheet of claim 24 wherein prior to carbonization said fibrillated fibers have a Canadian Standard Freeness of less than about 100.

26. The sheet of claim 24 wherein prior to carbonization said fibrillated fibers have a Canadian Standard Freeness of less than about 45.

27. The sheet of claim 24 wherein prior to carbonization said fibrillated fibers have a fiber diameter of less than about 250 nm.

28. The sheet of claim 24 further including active agents captured therein.

29. The sheet of claim 24 further including a catalyst or a catalyst support.

30. The sheet of claim 24 wherein said cationic material is selected from the group consisting of a colloid, a charged molecule, and a linear or branched polymer having positively charged atoms along a length of said polymer chain having said counter ion associated therewith.

* * * * *